Nov. 16, 1943. A. W. EVANS 2,334,320
HUB AND PLATE ASSEMBLY
Filed April 9, 1943

INVENTOR
ADDISON W. EVANS
By Robert B. Terry
ATTORNEY

Patented Nov. 16, 1943

2,334,320

UNITED STATES PATENT OFFICE 2,334,320

HUB AND PLATE ASSEMBLY

Addison W. Evans, Torrington, Conn., assignor to The Torrington Manufacturing Co., Torrington, Conn., a corporation of Connecticut Application April 9, 1943, Serial No. 482,487

10 Claims. (Cl. 287—53)

This invention relates to hub and plate assemblies, and more particularly to an improved, permanent structural connection between a hub and a flange or plate, to enable shaft mounting of the plate or of a rotor structure to which the plate is connected, or of which it forms a part. The form of connection herein to be described and claimed, is particularly adapted for use in a driving coupling, or as a mounting for a centrifugal blower wheel for example, although numerous similar adaptations will readily suggest themselves throughout the various fields of embodiment of rotatable machine elements.

There exists a considerable and widespread need in the mounting of fans, centrifugal blower wheels, certain types of gear elements, crank discs, driving couplings and numerous other fields, for a low cost, efficient and permanent or semipermanent connection between a plate element and a shaft-engaging hub. It is obviously wasteful of material and needlessly consuming of machine tool time, to form many of the hub and plate assemblies integrally from an initially unitary piece of metal; it is obviously much more practical and economical to form the hub and plate as separate elements, provided a permanent, rugged, low-cost connection can be made between such elements. It is to the attainment of this object that the invention is particularly directed.

A further object of the invention is realized in a device of the general class referred to, of such nature that the major elements thereof, or particularly the hub structure engaging the shaft, may be entirely formed as a screw-machine product, except for a finishing operation, with obvious savings in time and material costs.

Yet another object of the invention is attained in an improved assembly of a hub and plate element secured thereto, which will obviate any tendency of the parts to become angularly displaced after a period of usage, the combination being further such that the assembly of the hub and plate after individual fabrication, requires but a minimum of time, tooling and expense.

Yet another important object of the invention is attained in an improved arrangement for effecting a spline connection between a hub and an accompanying plate, the connection being of a type which offers, for many purposes, all of the advantages of a true spline connection between the parts, and the several advantages, except for replacement purposes, of a connection as by the more prevalent types of key and keyway, and at a lower cost.

An additional object of the invention is attained in a device which, while offering the several advantages outlined in the preceding object, is nonetheless of a durable, rugged nature, neat in appearance, and serves effectively to unite a hub and plate, so that they effectively constitute a one-piece structure, and will adequately resist all tendencies due to turning moment or torque, to displace either of the elements angularly with respect to the other.

The foregoing and numerous other objects will more clearly appear from the following detailed description of a preferred embodiment of the invention, particularly when considered in connection with the accompanying drawing, in which.

Figure 1:
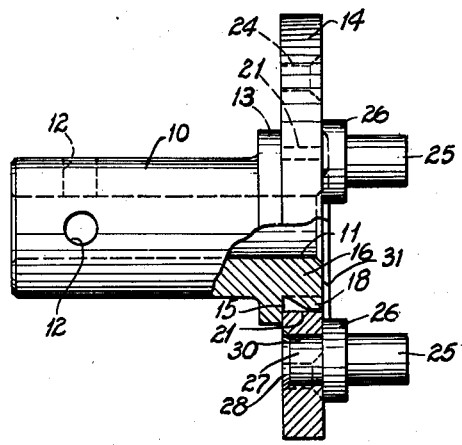
Fig. 1 is a side elevation, showing certain parts in section, of a hub and plate assembly constructed in accordance with present improvements.
Figure 2:
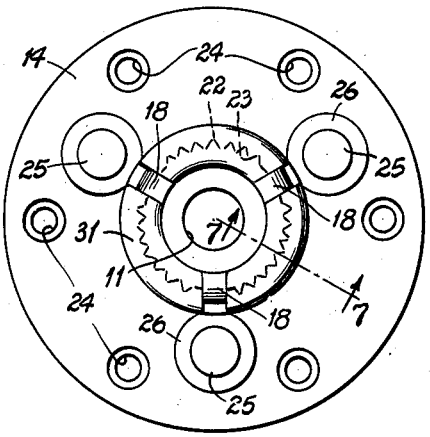
Fig. 2 is an end elevation of the structure of Fig. 1, as it would be viewed from the plate end of the assembly.

Referring now by characters of reference to the drawing, in a presently preferred form one of the major elements, namely the hub, is shown as consisting of a tubular section of steel stock generally indicated at 10, and being of a generally cylindrical shape provided with a central or axial bore 11. Extending inwardly from the periphery of the hub 10 near one end, is a tapped opening 12, for the reception of a set screw for securement of the assembly to a shaft (not shown) extending into or through the bore 11. It is a preference for many uses, to provide the assembly with a pair of the set screw openings 12, disposed say at right angles to each other. In most cases, the set screw openings 12 will be located somewhat nearer one end of the hub as dictated by reasons of ease of access to the assembly in its operative embodiment.

Figure 4:
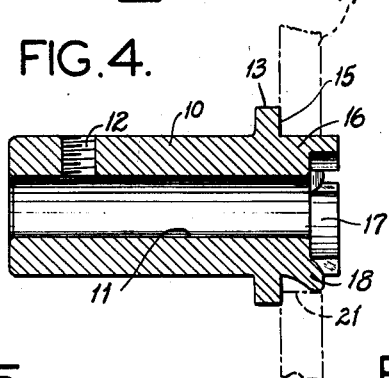
Fig. 4 is a sectional elevation of the hub element taken along an axial plane as indicated by line 4—4 of Fig. 3.
Figure 3:
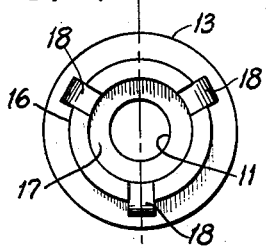
Fig. 3 is an end elevation of the hub element viewed from the plate-receiving end thereof.

Somewhat nearer the opposite end of the hub assembly is an integral annulus or collar portion 13, serving, as will appear, as an abutment for the plate element generally indicated at 14, and hereinafter more fully described. It will readily appear from Figs. 1 and 4 that, in assembly, the plate 14 will snugly bear against a seating face 15 which thus constitutes a shoulder or abutment for the plate. The shape and preferred proportions of the hub element as initially formed, and before assembly to the plate, are best shown in Fig. 4. Beyond the the shoulder 13 is a hub extension 16, all of which is hollow, but the extreme end of which is undercut somewhat inwardly of the end to provide a cupped portion 17 for a purpose more fully appearing in later description. The hub as a whole is by preference of relatively heavy wall construction, and it is also preferred for most usages that the wall about the cupped portion 17 be of considerable thickness. This latter wall portion, in the formation of the hub, is notched in at least one, but preferably in a plurality of equiangularly spaced zones, shown as three in the present example. The material resulting from this notching is deformed outwardly to result in a plurality, shown as three, divergent tongues or spline elements 18. As will appear from Figs. 3 and 4, the tongues or splines 18 as formed from parts of the material of the wall defining the cup portion 17, are divergent with respect to each other, and each has a distinctly radial as well as axial trend. The resulting splines in the example shown initially project at an angle, say of 45 degrees to the axis, and likewise in the same angular relation to a plane normal to the axis.

Figure 5:
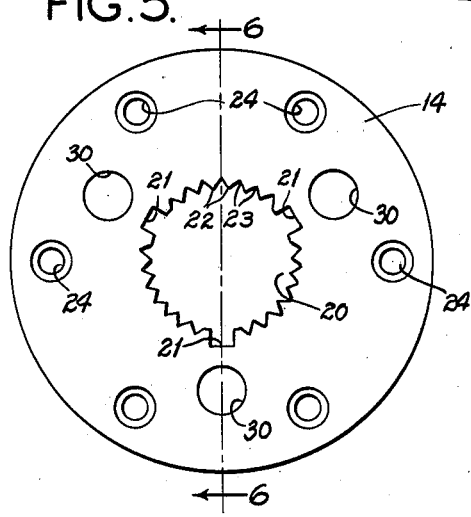
Fig. 5 is a face view of the plate element before application to the hub element.
Figure 6:
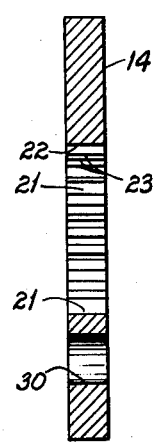
Fig. 6 is a sectional view of the plate element as taken along line 6—6 of Fig. 5.

Referring now to the plate element 14, this, similarly to the hub, may assume a variety of forms depending upon particular adaptability for usage, and will usually be circular in plan as suggested by Fig. 5, and is provided with a central hub-receiving opening 20. The opening 20 is of generally circular shape, but departs therefrom in that the plate is provided, in communication with the opening 20, with one or a plurality of spline grooves 21, three of which are shown, each being of substantially rectangular shape and dimensioned to conform with not much more than a working clearance to the splines 18, hence adapted in assembly as will now have appeared, to enable the plate 14 to be inserted over the extension 16 of the hub with the splines 18 projecting through grooves 21.

The margin defining the shaft opening 20 is further given a special formation exemplified by the serrations 22 and intervening indents 23, thus providing a sharply apexed, sawtooth periphery, in which the indents are of somewhat lesser radial extent than are the spline grooves 21. The serrated periphery of the shaft opening is, as to this feature in combination with a hub element, substantially shown, described and claimed in Letters Patent No. 2,272,695 issued to this applicant February 10, 1942, and assigned to The Torrington Manufacturing Company.

In further reference to the plate 14, this element may be provided with suitable openings such as 24 in any suitable number and arrangement, six thereof being shown in order to receive rivets or like securement elements as for attachment, for example, of the backplate of a centrifugal blower wheel. When the plate is utilized as an element of a coupling device, it is advantageously provided with driving lugs or pins indicated generally at 25 (Fig. 1). A convenient method of securement of pins of this type consists in the formation of a collar portion or shoulder 26 beyond which is extended a securement shank portion 27, the extreme end 28 thereof being upset in a countersunk recess 30 in the plate, three of which are shown. In case of the utilization of driving or securement pins 25 in or on the plate 14, it is a preference to locate the openings 30, hence the pins 25 in angular register or coincidence with, but radially outward of the spline seats 21, for a purpose hereinafter better appearing.

Referring now to the manner of assembling the separately completed hub and plate elements, a first step consists in insertion of the hub extension 16 through the aperture 20 of the plate, with the plate seated against the shoulder or abutment 13 substantially as shown by Fig. 4 wherein the plate is indicated in dotted lines, and with the splines 18 extended through the spline grooves 21. It will be observed also that while the splines project somewhat beyond the plate in an axial direction, the intervening wall portions of the cup 17 similarly project considerably beyond the plate. A finish assembly operation is now effected by supporting the hub in a suitable holding jig or the like, and swaging the extended end portions of the splines 18 firmly outwardly against the outer surface portion of the plate adjacent the hub aperture. The splines are thus beaded over, but the three projecting prongs or ends thereof are first pressed into place, following which the beading or swaging operation on the splines is completed as by a high-speed hammer.

Figure 7:
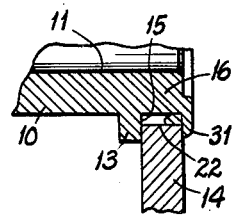
Fig. 7 is a fragmentary sectional elevation taken through the zone of the hub aperture of the plate to illustrate in assembly, the manner of securement of hub and plate.

At the same operation, or if desired, as a preceding or succeeding operation, the remaining extended portion of the hub neck, being the wall of the cup portion 17 intervening the splines, is swaged as by the high speed hammer, back firmly against the teeth 23 and into the flange serrations 22. From this, as will appear from the drawing, there is formed a substantially continuous bead or collar appearing at the end of the assembly just outwardly of the hub opening of the plate. Not only is the metal of the hub neck forced firmly into the serrations 22 and the splines firmly locked in the spline grooves, but the serrations and teeth are completely covered. The initial length of metal in the hub extension 16—17 is such that the bead resulting upon completion of assembly and indicated at 31, approximates in outside diameter the shoulder 13 as will readily appear from Figs. 1 and 7. It now becomes apparent that the inner periphery of the plate 14 adjacent the hub extension is firmly embraced, substantially over 360 degrees, between the bead 31 and the shoulder 13. Further assembly operations as in application of the flange and hub to the shaft and rotor elements need not be herein described since they will vary considerably with the different combinations in which the present improvements are utilized.

It will have appeared that the assembly as described serves fully to realize each of the several objectives above specifically stated, and others implied from the more detailed description.

Although the invention has been depicted by making a complete disclosure of one specific embodiment, the detail of description is to be understood solely in an instructive rather than in any limiting sense, since many changes are possible within the scope of the invention as defined by the claims hereunto appended.

I claim as my invention:

1. In a hub and plate assembly, a plate provided with an axial hub aperture, a hub provided with a tubular end portion extending through the hub aperture, a part of said tubular end portion being deformed outwardly to form a spline, the plate being recessed near the hub aperture to provide a spline groove conforming closely to the cross sectional shape of the spline, the spline projecting beyond the spline groove with its projecting portion upset into firm engagement with the adjacent portion of the plate.

2. In a hub and plate assembly, a plate provided with an axial hub aperture, a hub provided with a tubular end portion extending through the hub aperture, a part of said tubular end portion being deformed outwardly to form a spline, the plate being recessed near the hub aperture to provide a spline groove conforming closely to the cross sectional shape of the spline, the spline projecting beyond the spline groove with its projecting portion upset into firm engagement with the adjacent portion of the plate, and the remainder of the tubular end portion, beyond the plate, being deformed into firm holding engagement with the plate, about the hub aperture thereof.

3. In a hub and plate assembly, a plate provided with a hub aperture, a hub provided with a shoulder inwardly of one end, and the end beyond said shoulder being of tubular formation, a portion of said tubular end being deformed outwardly to constitute a spline, the plate being recessed near the hub aperture to provide a spline conforming seat, and the end of the spline being deformed against the adjacent material of the plate and coacting with the shoulder to grip the plate and preclude axial or angular displacement thereof on the hub.

4. A hub and plate assembly including a centrally apertured plate, a hub provided with a tubular end portion and formed to provide an abutment for the plate inwardly of the end portion, the tubular end portion having spaced parts of its wall divergently struck outwardly to constitute hub splines, the plate being recessed just outwardly of its hub opening, with the recesses conforming in shape and area to the adjacent cross sections of the splines, and the splines and intervening portions of the tubular end of the hub being swaged into firm engagement with the material of the plate adjacent the center opening thereof.

5. In an assembly of the character described, a hub, a hollow end thereon, a shoulder inwardly of the hollow end, spline portions constituted by radially upset marginal portions of the hollow end, a plate on said hollow end, said upset portions projecting beyond the plate when seated on the hub, and the projecting portions being deformed against the plate.

6. In a plate and hub assembly of the character described, a hub element having outwardly and axially extending splines formed near one end, a plate abutment spaced inwardly from said end, a plate overlying the hub and seated against said abutment, the plate being provided with spline grooves, and the splines projecting beyond said plate and deformed into holding engagement with the material of the plate adjacent the hub, whereby to prevent relative axial and angular displacement of the hub and plate.

7. In a hub and plate assembly, a plate provided with an axial hub aperture, a hub extended through said aperture, and provided with a shoulder, and a relatively heavy walled tubular end beyond said shoulder, a portion of said tubular end projecting radially beyond the remainder thereof to constitute a spline, the plate being recessed near the hub aperture to provide a conforming seat for the spline, a pin carried by the plate and having a portion projecting therebeyond, the end of the spline being deformed into firm engagement with the material of the plate adjacent the hub, and in engagement with the pin in a manner tending to prevent displacement of the pin in the plate.

8. The combination and arrangement of elements substantially as described in claim 7 but further characterized in that the pin is provided with a shoulder adjacent the plate, and that the end of the spline is further deformed into engagement with said shoulder for the purpose noted.

9. In an assembly of the general type described, a plate centrally apertured to receive a hub, a hub provided with a tubular portion extending through the hub aperture in the plate, the plate being further provided with cutaway portions in the region of the hub aperture, and angularly spaced, relatively enlarged recesses constituting spline grooves, the said tubular portion of the hub being deformed in angularly spaced zones to constitute splines occupying said spline grooves, and the end portions of the splines and the intervening portions of the tubular hub extension being deformed outwardly in such manner that the ends of the splines and the hub portions adjacent the outer face of the plate are in firm securement with the plate about the region of the hub aperture.

10. In a hub and plate assembly, a hub provided with an annular shoulder inwardly of one end, and a tubular portion beyond said shoulder, a plate provided with a hub aperture overlying the hub, and the plate being seated against said shoulder, the hub being provided with at least a pair of radially and axially projecting splines, and the plate being provided further with recesses constituting spline grooves and being serrated marginally of the hub aperture with the serrations fully intervening the spline grooves, the ends of the splines outwardly of the spline grooves, and the intervening portions of the metal of the hub being upset outwardly so as to occupy and cover the serrated portions of the plate and to bring the ends of the splines into firm engagement with the metal of the plate adjacent the spline grooves.

ADDISON W. EVANS.